United States Patent
Lee et al.

[11] Patent Number: 6,155,778
[45] Date of Patent: Dec. 5, 2000

[54] RECESSED TURBINE SHROUD

[75] Inventors: Ching-Pang Lee, Cincinnati; George A. Durgin, West Chester, both of Ohio

[73] Assignee: General Electric Company, Cincinnati, Ohio

[21] Appl. No.: 09/223,065

[22] Filed: Dec. 30, 1998

[51] Int. Cl.[7] .................................. F28F 9/22; F01D 5/18
[52] U.S. Cl. .................. 415/116; 415/117; 415/173.1; 415/173.4; 415/173.5; 415/914; 416/97 R
[58] Field of Search ........................ 415/115, 116, 415/117, 173.1, 173.4, 173.5, 914; 416/97 R

[56] References Cited

U.S. PATENT DOCUMENTS

| | | | |
|---|---|---|---|
| 4,497,610 | 2/1985 | Richardson et al. | |
| 4,526,226 | 7/1985 | Hsia et al. | 165/109 R |
| 4,893,987 | 1/1990 | Lee et al. | 416/92 |
| 4,992,025 | 2/1991 | Stroud et al. | 416/97 R |
| 5,048,288 | 9/1991 | Bessette et al. | 60/226.1 |
| 5,096,379 | 3/1992 | Stroud et al. | 416/97 R |
| 5,169,287 | 12/1992 | Proctor et al. | 415/115 |
| 5,547,340 | 8/1996 | Dalton et al. | 415/121.2 |
| 5,553,999 | 9/1996 | Proctor et al. | |
| 5,660,523 | 8/1997 | Lee | 416/97 R |

*Primary Examiner*—Edward K. Look
*Assistant Examiner*—Matthew T. Shanley
*Attorney, Agent, or Firm*—Andrew C. Hess; Rodney M. Young

[57] ABSTRACT

A turbine shroud includes a panel having inner and outer surfaces extending between forward and aft opposite ends. The panel includes forward and aft hooks for supporting the panel radially atop a row of turbine rotor blades. The panel includes a plurality of recesses in the inner surface thereof which face tips of the blades. The recesses extend only in part into the panel for reducing surface area exposed to the blade tips.

20 Claims, 4 Drawing Sheets

RECESSED TURBINE SHROUD

BACKGROUND OF THE INVENTION

The present invention relates generally to gas turbine engines, and, more specifically, to turbine shrouds therein.

In a gas turbine engine, air is pressurized in a compressor, mixed with fuel in a combustor, and ignited for generating hot combustion gases which flow downstream through one or more turbine stages which extract energy therefrom. A high pressure turbine (HPT) first receives the combustion gases from the combustor and extracts energy therefrom for powering the compressor. A low pressure turbine (LPT) follows in turn the HPT for extracting additional energy for providing output energy typically used for powering a fan disposed upstream of the compressor in a typical aircraft gas turbine engine application.

The HPT includes a stationary turbine nozzle having a plurality of circumferentially spaced apart stator vanes which control discharge of combustion gases from the combustor. The HPT also includes at least one rotor stage having a plurality of circumferentially spaced apart turbine rotor blades extending radially outwardly from a supporting rotor disk. The blades include airfoils which receive combustion gases from the nozzle and extract energy therefrom for rotating the rotor disk and in turn rotating the compressor. The airfoils are typically hollow and include internal cooling circuits therein through which a portion of pressurized air bled from the compressor is channeled for cooling the blades.

Surrounding the rotor blades is an annular turbine shroud fixedly joined to the surrounding stator casing. The shroud is suspended closely atop the blade tips for providing a small gap or tip clearance therebetween. The tip clearance should be as small as possible to provide an effective fluid seal thereat during operation for minimizing the amount of combustion gas leakage therethrough for maximizing efficiency of operation of the engine. However, due to differential thermal expansion and contraction of the rotor blades and surrounding turbine shroud, the blade tips occasionally rub against the inner surface of the shroud causing abrasion thereof.

Since the blade tips are at the radially outermost end of the rotor blade and are directly exposed to the hot combustion gases, they are difficult to cool and the life of the blade is thereby limited. Furthermore, during a blade tip rub with the surrounding shroud, the blade tips are additionally heated by friction which additionally affects the blade useful life. The friction heat generated during a blade tip rub further increases the radial expansion thereof and correspondingly increases the severity of the tip rub.

Since the turbine shroud itself is exposed to the hot combustion gases, it too is also cooled by bleeding a portion of the pressurized air from the compressor, which is typically channeled in impingement cooling against the radially outer surface of the turbine shroud. Turbine shrouds typically also include film cooling holes extending radially therethrough with outlets on the radially inner surface of the shroud from which is discharged the cooling air in a film for cooling the inner surface of the shroud.

Since blade tip rubs are unavoidable for maximizing performance of the turbine, both the turbine shrouds and blade tips are subject to abrasion wear. However, such abrasion may cause the film cooling holes in the turbine shrouds to plug which can additionally adversely affect the useful life of the turbine shroud.

Accordingly, it is desired to provide an improved turbine shroud for cooperating with turbine rotor blade tips during tip rubs for reducing the severity of the tip rubs and reducing friction heating of the blade tip.

BRIEF SUMMARY OF THE INVENTION

A turbine shroud includes a panel having inner and outer surfaces extending between forward and aft opposite ends. The panel includes forward and aft hooks for supporting the panel radially atop a row of turbine rotor blades. The panel includes a plurality of recesses in the inner surface thereof which face tips of the blades. The recesses extend only in part into the panel for reducing surface area exposed to the blade tips.

DETAILED DESCRIPTION OF THE INVENTION

Figure 1:
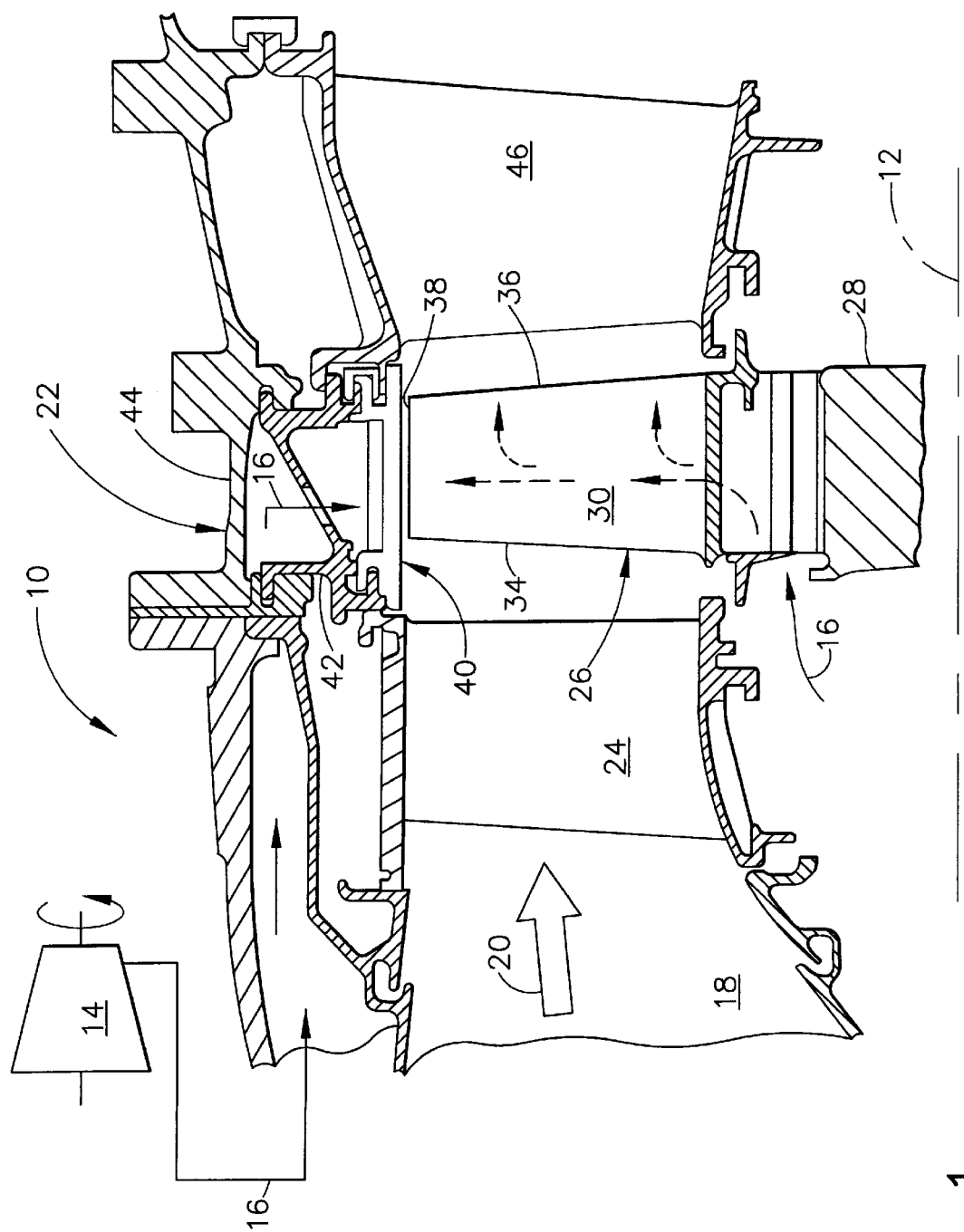
FIG. 1 is a partly sectional, axial view through a turbine portion of a gas turbine engine having a turbine shroud in accordance with an exemplary embodiment of the present invention.

Illustrated in part in FIG. 1 is a gas turbine engine 10 which is axisymmetrical about a longitudinal or axial centerline axis 12. The engine includes a conventional, multistage axial compressor 14 which pressurizes ambient air to produce compressed air 16.

The compressor is disposed in flow communication with an annular combustor 18, shown in aft part. A majority of the compressed air from the compressor is mixed with fuel in the combustor and ignited for generating hot combustion gases 20 which flow downstream therethrough. The combustion gases are discharged from the combustor into a high pressure turbine (HPT) 22 which extracts energy therefrom for powering the compressor 14.

The HPT 22 includes an annular stator nozzle 24 adjoining the discharge end of the combustor for receiving and turning the combustion gases therefrom. The nozzle is conventional and includes a plurality of circumferentially spaced apart stator vanes mounted at their radially outer and inner ends to corresponding annular outer and inner bands. Disposed immediately downstream from the nozzle is a row of turbine rotor blades 26 extending radially outwardly from a supporting rotor disk 28 which is conventionally configured and joined to the compressor 14 for the powering thereof.

Figure 2:
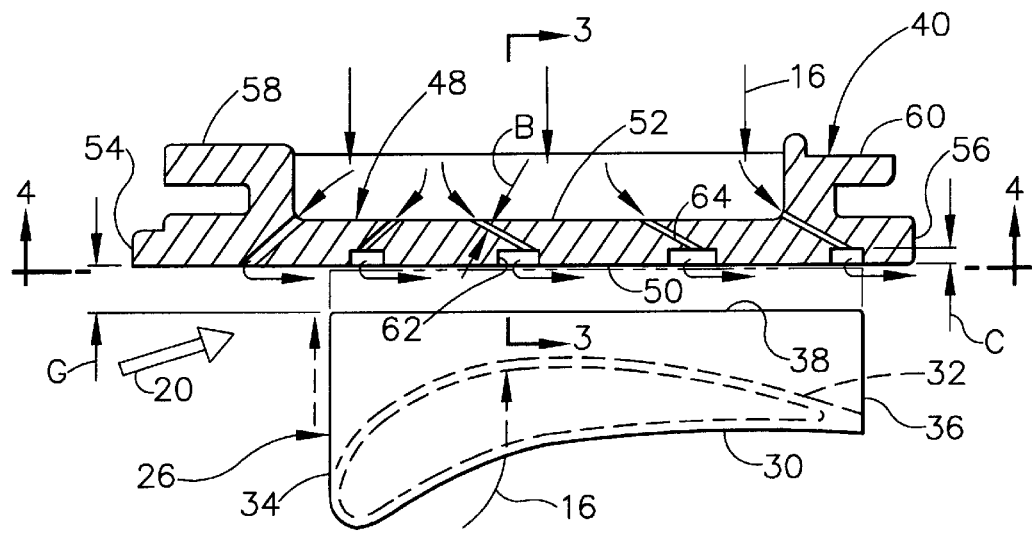
FIG. 2 is an enlarged, axial sectional view through a portion of the turbine shroud illustrated in FIG. 1 spaced atop the tip of a turbine rotor blade.
Figure 3:
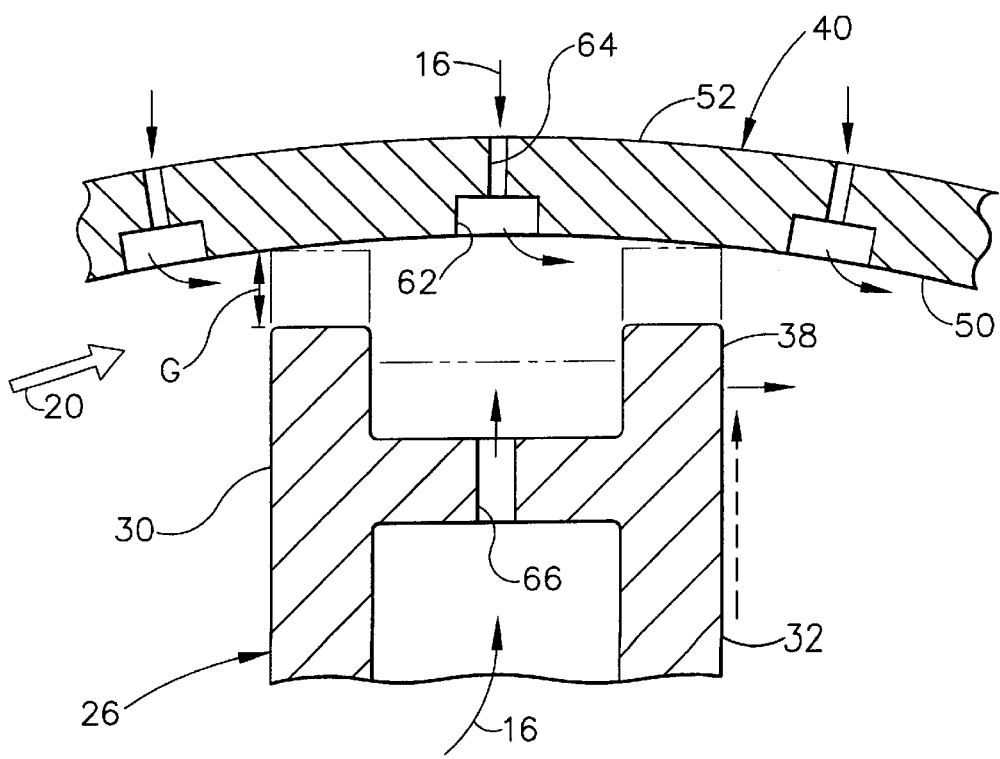
FIG. 3 is a radial sectional view through the blade tip and portion of the turbine shroud illustrated in FIG. 2 and taken along line 3—3.

As shown in FIGS. 2 and 3, each turbine blade 26 is hollow and is conventionally configured for receiving a portion of the compressed air 16 bled from the compressor for the cooling thereof in any conventional manner. The airfoil portion of the blade extending radially outwardly from the rotor disk and includes a generally concave, pressure side 30 with a circumferentially opposite generally convex, suction side 32. The pressure and suction sides are joined together at axially opposite leading and trailing edges 34, 36. The radially outermost end of the blade defines a blade tip 38 in the form of a rib extension of the two airfoil sides leaving an open tip cavity therebetween as shown in FIG. 3.

As initially shown in FIG. 1, a stationary turbine shroud 40 circumferentially surrounds the row of turbine blades 26 and is suitable joined to a hanger 42 which in turn is mounted in a surrounding stator casing 44 in any conventional manner. Disposed downstream from the HPT 22 is a turbine nozzle 46 of a low pressure turbine (LPT), shown in part, which includes one or more stages of low pressure turbine blades (not shown) which may be used for powering a fan (not shown) in an exemplary aircraft gas turbine engine application.

As shown in more detail in FIGS. 2 and 3, the turbine shroud 40 is mounted atop the turbine blades 26 to provide a predetermined tip clearance or gap G with the blade tip 38. The tip clearance is made as small as practical for providing a fluid seal between the blade tips and the turbine shroud for minimizing the leakage of the combustion gases 20 therebetween during operation. However, due to differential thermal expansion and contraction of the turbine blades and turbine shroud during operation, the blade tips 38 may occasionally close the tip clearance and rub against the turbine shroud as illustrated in phantom line in FIGS. 2 and 3. The resulting tip rubbing against the turbine shroud causes friction heating of the blade tip and introduces additional heat therein which affects the useful life of the blade.

But for the present invention, the turbine shroud 40 may have any conventional configuration, and is modified for improving its performance in the event of a tip rub with the rotor blades 26.

As initially shown in FIG. 2, the turbine shroud is typically formed of a plurality of circumferentially adjoining, arcuate panels 48. Each panel includes a radially inner surface 50 which faces radially inwardly toward the blade tips 38 and defines therewith the tip clearance G. Each panel also includes an opposite, radially outer surface 52 against which is received in impingement a portion of the compressed air 16 suitably channeled thereto in a conventional manner for impingement cooling thereof.

Each panel also includes axially spaced apart forward and aft opposite ends 54,56 between which the inner and outer surfaces extend. A circumferentially extending forward hook 58 is integrally joined to the outer surface of the panel forward end, and a circumferentially extending aft hook 60 is integrally joined to the panel outer surface at the aft end for supporting the panel from the hanger 42 illustrated in FIG. 1 in a conventional manner.

Figure 4:
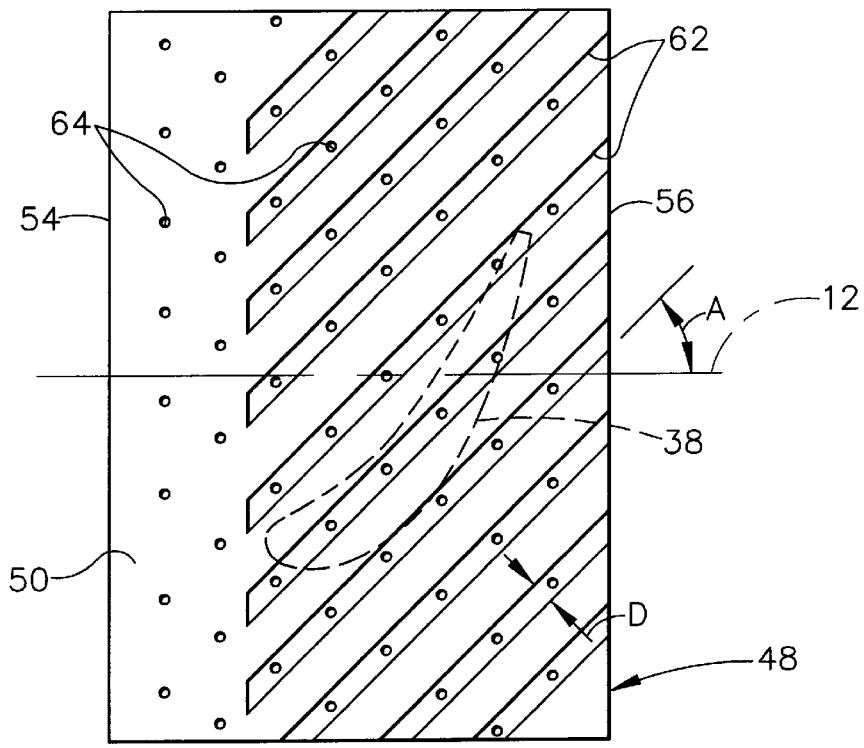
FIG. 4 is a radially outwardly facing plan view of the inner surface of the turbine shroud illustrated in FIG. 2 and taken along line 4—4.

As shown in FIGS. 2–4, a plurality of recesses 62 are disposed in the panel inner surface 50 and extend only in part into the panel radially outwardly toward the panel outer surface 52. These recesses 62 are provided in accordance with the present invention for reducing surface area exposed to the blade tips 38 so that during a blade tip rub with the shroud, reduced rubbing of the blade tips with the shroud occurs for correspondingly decreasing frictional heat in the blade tip. Reduced frictional heat permits the available cooling of both the blade tip and the turbine shroud to reduce the temperature thereof other than it would be with a continuous conventional shroud without the surface interruptions provided by the recesses.

As shown in the exemplary embodiment illustrated in FIGS. 2–4, the recesses 62 are preferably spaced apart both axially between the forward and aft ends of each panel, as well as circumferentially in the direction of blade rotation between the circumferential opposite ends of each panel. The recesses 62 are also preferably arranged in rows extending obliquely from the centerline axis 12 at an inclination angle A which is preferably greater than zero degrees and preferably less than 90°. In this way, the recesses 62 neither extend only axially nor only circumferentially in the panels for maintaining the sealing effectiveness of the small tip clearance G between the shroud and blade tip during operation.

In the preferred embodiment illustrated in FIGS. 2–4, a plurality of laterally spaced apart cooling holes 64 extend through the panel between the outer and inner surfaces thereof in flow communication with the recesses 62 for channeling cooling air thereto. The cooling holes 64 may have any conventional orientation in the panel for channeling the cooling air through the panel for internal convection cooling as well as providing film cooling of the panel inner surface 50.

In the exemplary embodiment illustrated in FIG. 4, each slot row is continuous, and includes a plurality of the cooling holes 64 therein. In this way, the several cooling holes per slot collectively channel cooling air therein which may then be discharged as a continuous blanket of cooling air along the inner surface of the panel.

Since the axial length of each shroud panel is typically substantially longer than the axial extent of the blade tip as shown in FIG. 2, the recesses 62 need only be provided in the portion of the panel inner surface against which the blade tip may rub during operation. For example, since the forward end 54 of each panel extends forwardly from the leading edge of the blade tip 38, as shown in phantom in FIG. 4, the slots 62 need not extend in this region but preferably commence aft of the panel forward end axially aligned with the blade leading edge.

Since the blade trailing edge 36 extends in the aft direction closely adjacent to the aft end of the panel, the recesses preferably extend completely to the panel aft ends. In this way, in the event of a blade tip rub with the shroud, the blade tip will rub the panel inner surface over the axial extent of the recesses, with the recesses providing a reduction in contact surface area, and a corresponding reduction in friction heat.

As shown in FIG. 2, each of the cooling holes 64 is preferably cylindrical and has a diameter B. Each of the recesses 62 has a depth C, and a width D as illustrated in FIG. 4. The depth C and width D of each recess are preferably larger than the hole diameter B, and each is preferably at least twice as large.

In the exemplary embodiment illustrated in FIG. 4, each of the recesses 62 in continuous slot form is substantially longer in length than its width D. In this way, the cooling air discharged into each slot 62 by the cooling holes 64 therein is diffused to improve formation of a continuous layer of cooling air film from each slot. And, the cooling holes 64 are protected inside the slots from damage or closure by blade tip rubbing with the shroud panel. Since some of the cooling holes 64 may be located in the otherwise imperforate panel inner surface 50 forwardly of the recesses 62 as illustrated in FIG. 4, they are not subject to blade tip rubbing, and therefore may be configured in any conventional manner for providing effective film cooling therein if desired.

In the preferred embodiment illustrated in FIG. 4, the slots 62 are circumferentially inclined in the same direction of inclination or twist of the blade tip 38. In this way, the axial cross section of the recesses 62 as illustrated in FIG. 3 are spaced apart from each other in the circumferential direction for maintaining effective fluid sealing in the tip clearance G between the ribs of the blade tip 38 and the cooperating panel inner surface 50.

The blades typically include tip holes 66 which discharge a portion of the cooling air 16 from inside the rotor blade into the tip cavity between the ribs of the blade tip 38. This pressurizes the tip clearance and improves tip sealing with the shroud panel. Since no one slot 62 as illustrated in FIG. 3 circumferentially bridges the entire blade tip between its pressure and suction sides, substantially full sealing performance of the tip clearance is maintained without leakage of the combustion gases 20 through the recesses 62 themselves. Furthermore, the cooling air 16 discharged through the panel into the recesses 62 prevents leakage of the combustion gases therethrough.

Figure 5:
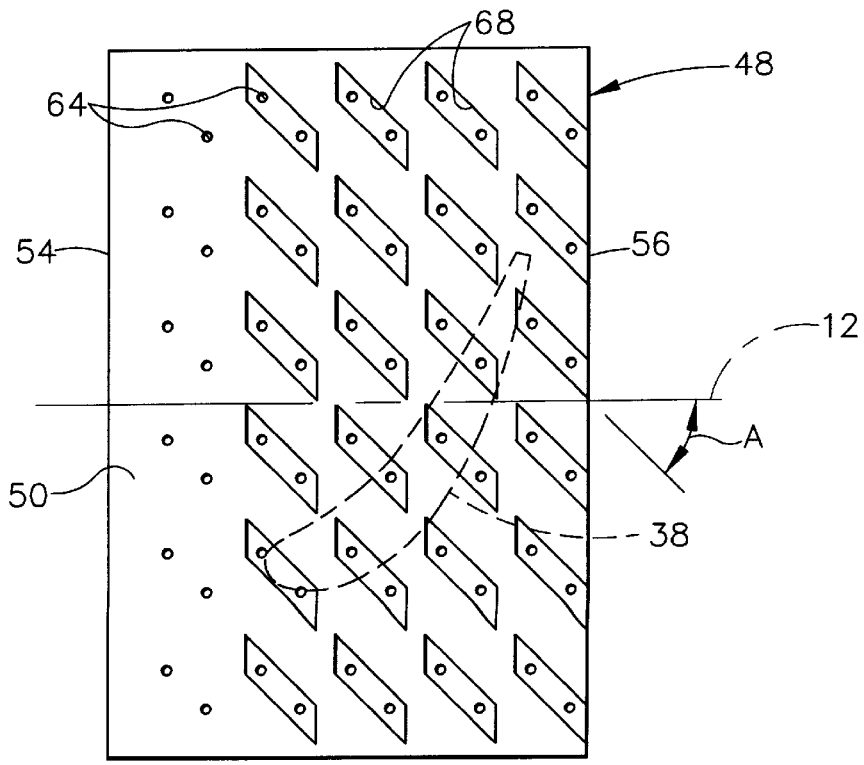
FIG. 5 is a plan view of the inner surface of a portion of the turbine shroud illustrated in FIG. 2 in accordance with another embodiment of the present invention.

FIG. 5 illustrates an alternate embodiment of the present invention like FIG. 4, except that each slot row is discontinuous, and includes a plurality of aligned truncated slots 68 therein, with the slots 68 having an inclination angle A which is opposite to that of the slots 62 illustrated in FIG. 4. Also in this embodiment, each of the slots 68 includes a plurality of the cooling holes 64 therein which feed the cooling air 16 in a similar manner for undergoing diffusion in the slots and forming a blanket of film cooling air in the downstream direction.

Figure 6:
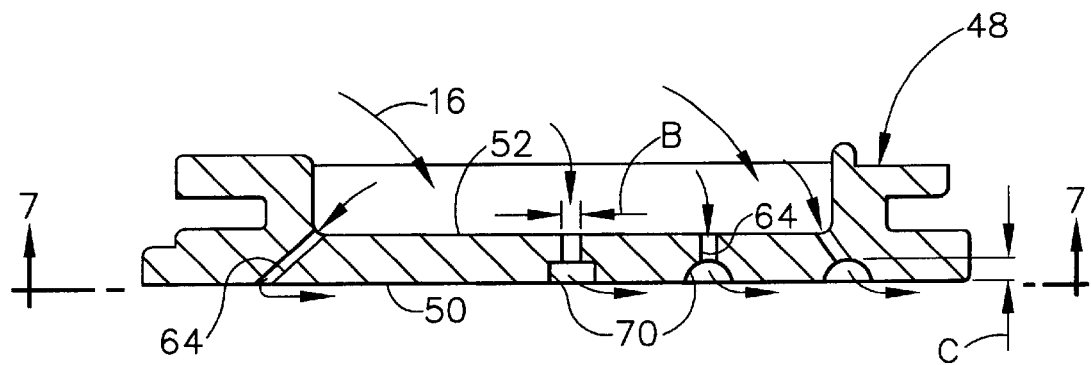
FIG. 6 is an axial sectional view of the turbine shroud illustrated in FIG. 2 in accordance with another embodiment of the present invention.
Figure 7:
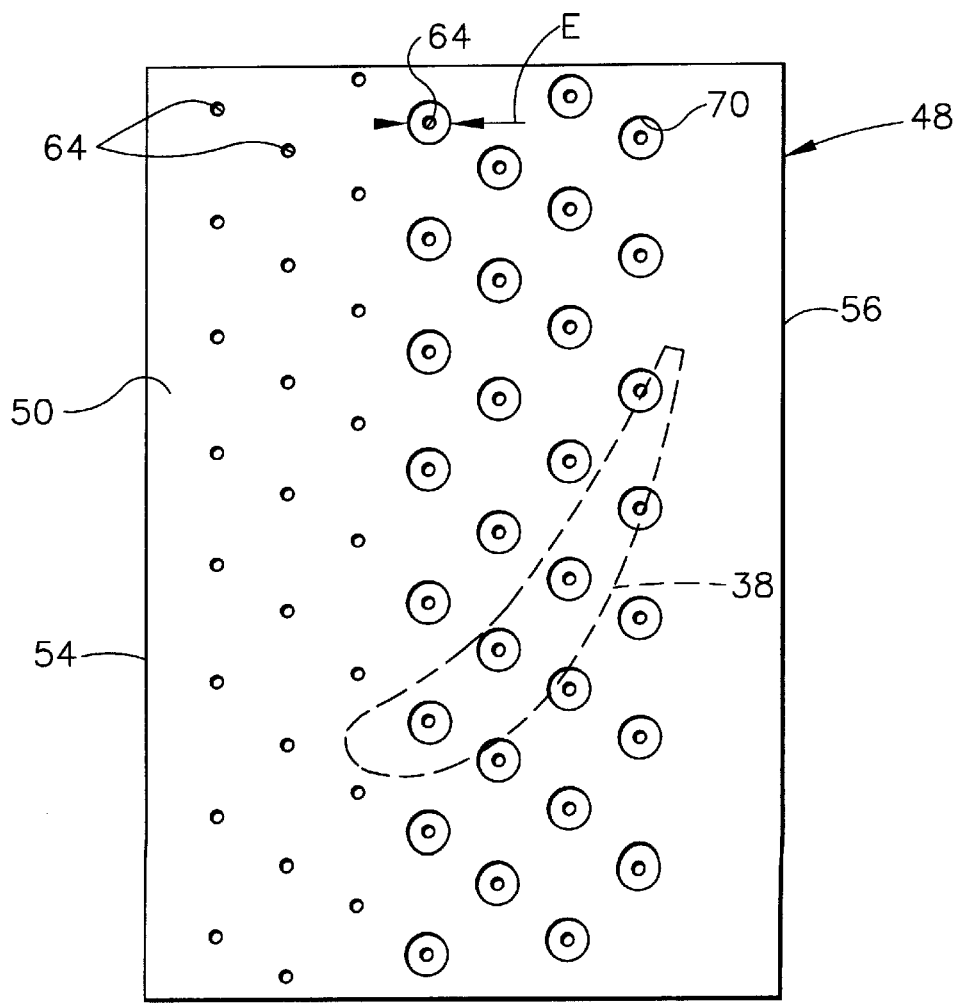
FIG. 7 is a plan view of the inner surface of the turbine shroud illustrated in FIG. 6 and taken along line 7—7.

Illustrated in FIGS. 6 and 7 is yet another embodiment of the invention wherein the recesses are in the form of preferably circular dimples or counterbores 70. Each dimple 70 includes a single respective one of the cooling holes 64 centrally disposed therein. Each dimple may be a hemisphere or a cylindrical counterbore, for example.

The dimples 70 as shown in FIG. 7 are aligned in a suitable pattern in the exemplary form of rows inclined relative to the engine centerline axis. The dimples are thusly both axially and circumferentially spaced apart from each other in a manner analogous to the axial and circumferential spacing of the continuous slot recesses 62 in FIG. 4 and the truncated slots 68 in FIG. 5.

In the preferred embodiment, each dimple 70 has a diameter E which is preferably three times the diameter B of the cooling holes 64 disposed therein. In this way, the dimples 70 provide an effective reduction in surface area subject to blade tip rubbing.

The compressed air 16 discharged through each cooling hole 64 and corresponding dimple 70 is diffused inside the dimple for providing a film cooling layer downstream therefrom. And, each cooling hole within the dimple 70 is protected from damage or closure by blade tip rubbing by the surrounding open dimple 70.

In these various embodiments disclosed above, the various recesses effectively reduce blade tip rubbing area, and correspondingly reduce friction heat generated during a blade tip rub. The blade tips therefore run cooler and have an improved life. Correspondingly, each panel 48 has less surface area of the inner surface 50 exposed to blade tip rubbing which decreases the friction heat therein during rubbing and reduces the corresponding temperature at the panel inner surface. This promotes panel life and reduces the severity of abrasion damage during blade tip rubbing. And, the cooling holes 64 hidden within the recesses are protected from damage by the blade tip during rubbing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which

We claim:

1. A turbine shroud for surrounding a row of turbine rotor blades to control tip clearance therebetween comprising:

a panel having an inner surface for facing tips of said blades and defining therewith said tip clearance, an opposite outer surface, and spaced apart forward and aft opposite ends;

forward and aft hooks integrally joined to said panel forward and aft ends, respectively, for supporting said panel; and a plurality of recesses disposed in said inner surface and extending only in part into said panel toward said outer surface for reducing surface area exposed to said blade tips.

2. A shroud according to claim 1 wherein said recesses are spaced apart both axially between said panel forward and aft ends, and circumferentially.

3. A shroud according to claim 2 wherein said recesses are arranged in rows extending obliquely between said panel forward and aft ends.

4. A shroud according to claim 3 further comprising a plurality of cooling holes extending through said panel between said outer and inner surfaces in flow communication with said recesses for channeling cooling air thereto.

5. A shroud according to claim 4 wherein each of said cooling holes has a diameter, and said recesses have a width and depth being larger than said hole diameter.

6. A shroud according to claim 5 wherein said recesses comprise slots being longer in length than wide.

7. A shroud according to claim 6 wherein each slot row is continuous and includes a plurality of said cooling holes therein.

8. A shroud according to claim 6 wherein each slot row is discontinuous, and includes a plurality of aligned slots therein, and each of said slots includes a plurality of said cooling holes therein.

9. A shroud according to claim 5 wherein said recesses comprise dimples each having a respective one of said cooling holes centrally disposed therein.

10. A shroud according to claim 9 wherein said dimples are circular.

11. A turbine shroud for surrounding a row of turbine rotor blades to control tip clearance therebetween comprising a panel having a plurality of rows of recessed slots disposed obliquely in an inner surface thereof for defining said clearance with tips of said blades.

12. A shroud according to claim 11 further comprising a plurality of cooling holes extending through said panel between said inner surface and an outer surface thereof in flow communication with said recesses for channeling cooling air thereto.

13. A shroud according to claim 12 wherein each slot row is continuous and includes a plurality of said cooling holes therein.

14. A shroud according to claim 12 wherein each slot row is discontinuous, and includes a plurality of aligned slots therein, and each of said slots includes a plurality of said cooling holes therein.

15. A turbine shroud for surrounding a row of turbine rotor blades to control tip clearance therebetween comprising a panel having a plurality of recessed dimples extending only in part into an inner surface thereof for defining said clearance with tips of said blades, and said dimples being arranged in rows extending obliquely in said inner surface.

16. A shroud according to claim 15 further comprising a plurality of cooling holes extending through said panel between said inner surface and an outer surface thereof in flow communication with respective ones of said dimples for channeling cooling air thereto.

17. A shroud according to claim 16 wherein said dimples are circular.

18. A shroud according to claim 17 wherein said dimples are cylindrical.

19. A shroud according to claim 17 wherein said dimples are hemispheres.

20. A shroud according to claim 17 wherein each dimple has a diameter thrice the diameter of the cooling hole disposed therein.

* * * * *